US010595383B1

United States Patent
Mays, II et al.

(10) Patent No.: US 10,595,383 B1
(45) Date of Patent: Mar. 17, 2020

(54) DEVICE AND METHOD FOR PROGRAMMING OR CONFIGURING OF NFC EQUIPPED LED DRIVER

(71) Applicant: Universal Lighting Technologies, Inc., Madison, AL (US)

(72) Inventors: Stephen D. Mays, II, Madison, AL (US); Reggie Anglin, Madison, AL (US); John J. Dernovsek, Madison, AL (US); Scott Price, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/257,685

(22) Filed: Jan. 25, 2019

Related U.S. Application Data

(60) Provisional application No. 62/622,365, filed on Jan. 26, 2018.

(51) Int. Cl.
*H05B 37/02* (2006.01)
*G06F 8/61* (2018.01)
(Continued)

(52) U.S. Cl.
CPC .......... *H05B 37/0272* (2013.01); *G06F 8/61* (2013.01); *H04B 5/0031* (2013.01);
(Continued)

(58) Field of Classification Search
CPC ... H04L 41/0809; H04L 41/20; H05B 5/0031; H05B 5/0068
See application file for complete search history.

(56) References Cited

U.S. PATENT DOCUMENTS 5,039,914 A 8/1991 Szuba
5,089,751 A 2/1992 Wong et al.
(Continued)

FOREIGN PATENT DOCUMENTS

EP 2306791 A2 4/2011
WO 2014013377 A2 1/2014

OTHER PUBLICATIONS

NXP Semiconductors: NT3H1101/NT3H1201, NTAG I2C—Energy Harvesting Type 2 Tag with field detection pin and I2C Interface, Rev. 3.3—Jul. 15, 2015, 265433, Product data sheet Company Public.

*Primary Examiner* — Raymond R Chai
(74) *Attorney, Agent, or Firm* — Patterson Intellectual Property Law, P.C.; Gary L. Montle

(57) ABSTRACT

A portable apparatus is provided for configuring and/or programming lighting drivers without mains power application. An apparatus housing comprises first and second connectors and an antenna. During a first mode wherein the first connector is coupled to an external computing device, a battery receives and stores power therefrom, and a first controller receives and stores at least driver configuration settings therefrom. When the external device is disconnected the battery powers the apparatus, which polls a transceiver circuit to detect a driver antenna proximate to the apparatus antenna. The apparatus housing is configured to mount to a luminaire comprising the detected driver, wherein the second connector is coupled to the driver and the battery provides power to a driver controller. The first controller also during this second mode transfers the stored at least driver configuration settings to the driver controller via the operably proximate antennae, for example via bidirectional negotiations therewith.

18 Claims, 6 Drawing Sheets

(51) Int. Cl.
*H04B 5/00* (2006.01)
*H04L 12/24* (2006.01)

(52) U.S. Cl.
CPC ....... *H04B 5/0068* (2013.01); *H04L 41/0809* (2013.01); *H04L 41/20* (2013.01)

(56) References Cited

U.S. PATENT DOCUMENTS

| | | |
|---|---|---|
| 6,144,539 A | 11/2000 | Konopka et al. |
| 6,204,613 B1 | 3/2001 | Hesterman |
| 6,356,027 B1 | 3/2002 | Zhang et al. |
| 7,333,353 B2 | 2/2008 | Yin |
| 7,750,577 B2 | 7/2010 | Nerone et al. |
| 8,654,485 B1 | 2/2014 | Koehler |
| 9,693,411 B1 | 6/2017 | Xiong et al. |
| 9,723,667 B1 | 8/2017 | Xiong et al. |
| 10,128,101 B2 | 11/2018 | Goscha et al. |
| 2009/0079357 A1 | 3/2009 | Shteynberg et al. |
| 2010/0102747 A1 | 4/2010 | Ilyes et al. |
| 2010/0181935 A1 | 7/2010 | Wu |
| 2011/0285311 A1 | 11/2011 | Yang et al. |
| 2012/0249001 A1 | 10/2012 | Okubo et al. |
| 2013/0082604 A1 | 4/2013 | Williams et al. |
| 2014/0117868 A1 | 5/2014 | Lopez et al. |
| 2014/0125241 A1 | 5/2014 | Elferich et al. |
| 2014/0145607 A1 | 5/2014 | Goscha et al. |
| 2014/0253562 A1 | 9/2014 | Yaras |
| 2015/0296598 A1* | 10/2015 | Haid ................ H05B 37/0272 315/291 |
| 2016/0165702 A1* | 6/2016 | Lai .................... H05B 33/0845 315/201 |
| 2016/0242253 A1 | 8/2016 | Bhagwat et al. |
| 2016/0353002 A1* | 12/2016 | Clark ................. H04N 5/2251 |
| 2017/0041188 A1* | 2/2017 | Panchapakesan ... H04L 41/0809 |

\* cited by examiner

DEVICE AND METHOD FOR PROGRAMMING OR CONFIGURING OF NFC EQUIPPED LED DRIVER

CROSS-REFERENCES TO RELATED APPLICATIONS

This application claims benefit of U.S. Provisional Patent Application No. 62/622,365, filed Jan. 26, 2018, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to lighting devices such as light emitting diode (LED) drivers. More particularly, an embodiment of an invention as disclosed herein relates to an electrically isolated method for digitally dimming, configuring and updating the firmware of a programmable lighting device through wireless communication.

Lighting devices such as light emitting diode (LED) drivers frequently have their operating parameters configured before shipping to customers for installation. Various operating parameters of the LED driver are typically reconfigured at other stages of application, as for example when a driver is first removed from its packaging it may be desired to apply a default configuration to satisfy the needs for most of the LED drivers at a particular installation. Further, once a new driver is installed with other LED drivers in a luminaire, it may be required that all the drivers in the luminaire or series of luminaires receive a configuration unique to their installation.

It would be desirable to provide one convenient device that is capable of configuring drivers without application of AC mains input power to the LED driver, and is also capable of reprogramming LED drivers without the need for a constant wired (e.g., USB) connection. It would be further desirable for the device to be easily implemented and even capable of being connected to the LED driver (or to the luminaire in functional association with the LED driver) with one hand.

There are numerous examples of methods to program and/or reprogram microcontrollers, using for example dedicated programming connections or a bootloader. There are also examples of handheld devices and methods developed to configure certain LED drivers by implementing near field communications (NFC) technology. However, there are no known arrangements that can both configure and reprogram an NFC equipped LED driver.

To program or reprogram the microcontroller of an LED driver, there are numerous examples of commercial programming devices, some of which can be powered by an external battery for remote operation. Another common option for programming and reprogramming is to install a bootloader in the microcontroller to facilitate the programming via a nonproprietary interface, examples of which may include a synchronous serial interface, such as an SPI or I2C interface, or an asynchronous serial interface, such as a UART interface.

It is common for an LED driver to be equipped with NFC technology to provide a means for operation configuration without having an AC mains input applied to the LED driver. An NFC reader/writer may be placed in the non-volatile memory of the NFC equipped driver that represents a change in LED driver behaviors or operable levels.

Typical NFC reader/writers require an external power source, via for example a USB connection to a personal computer (PC) or laptop, which can be convenient if the LED driver has not already been installed in a luminaire. An example of where this method can be convenient is within a pre-assembly area of a luminaire manufacturer where a PC or laptop and an NFC reader/writer is provided. The NFC equipped drivers are removed from the provided transportation housing, the antennae are moved one at a time within proximity of the NFC reader/writer's antenna, and configuration data is placed in the non-volatile memory of the respective driver.

Energy and data are transferred by magnetic flux lines generated by the reader/writer, which are absorbed into the sheet steel commonly used by luminaires and LED drivers, making this process inconvenient at best after the LED driver is installed in a luminaire.

Furthermore, once the luminaire with the NFC equipped driver is installed at a job site, the length of the USB cable connecting the NFC reader/writer to the PC or laptop and the complication associated with attempting to manage a PC or laptop while simultaneously attempting to reach an installed luminaire make this method even more inconvenient and difficult. For example, if a luminaire is installed in a ceiling with an NFC equipped LED driver that requires reconfiguration, an installer would likely have to climb a ladder with a laptop and a USB connected reader/writer and attempt to reconfigure the driver via NFC, the inconvenience and potential dangers of which may be readily appreciated.

BRIEF SUMMARY

In view of the aforementioned problems, various embodiments of a device and method as disclosed herein may desirably both program and configure NFC-equipped LED drivers via an NFC interface.

Such devices may desirably be quickly and easily mounted to, and subsequently removed from. either an NFC equipped driver or the inside wall of a luminaire in association with the NFC equipped LED driver.

A particular embodiment of an apparatus as disclosed herein for configuring and/or programming one or more programmable lighting drivers includes a first connector having one or more terminals, a second connector having one or more terminals, and an antenna. An energy storage device is coupled to the first connector and configured, during a first operating mode wherein the first connector is coupled to an external computing device, to receive and store power therein. A first controller is coupled to the first connector and configured during the first operating mode to receive and store at least driver configuration settings. The energy storage device is further configured during a second operating mode, wherein the second connector is coupled to a corresponding connector for a programmable lighting driver, to provide power to a second controller associated with the driver. The first controller is further configured during the second operating mode to transfer the stored at least driver configuration settings to the second controller via a wireless communications network comprising the antenna and a corresponding antenna for the driver.

In another embodiment, the apparatus further includes a first power converter configured to deliver a first power to the first controller when the first connector is disconnected from the external computing device, and a second power converter configured to deliver a second power to the driver during the second operating mode.

In another embodiment, the apparatus further includes a housing configured to mount with respect to a luminaire having the driver installed thereto, wherein the antenna for the apparatus is positioned in operable proximity to the corresponding antenna for the driver. For example, at least a portion of the housing may be mounted to at least a corresponding portion of a housing associated with the driver. Alternatively, the housing may be detachably coupled to a side of the luminaire.

In another embodiment, the apparatus further includes a non-volatile memory unit functionally linked to the first controller to retrievably store the at least driver configuration settings. Alternatively, the first controller may itself include the non-volatile memory unit to retrievably store the at least driver configuration settings received thereby.

In another embodiment, the first controller is coupled to the antenna via a near field communication transceiver, and the controller is configured during a third operating mode, wherein the first connector is disconnected from the external computing device and the second connector is disconnected from any driver, to poll the near field communication transceiver for a driver antenna in operable proximity thereto. One or more indicators may further be coupled to the first controller, at least one of the one or more indicators configured to indicate a detected operable proximity between the antenna and a driver antenna, and an actuator may be configured upon user actuation to initiate the second operating mode wherein power is provided to the second controller. At least one of the one or more indicators may still further be configured to indicate a completed transfer of the at least driver configuration settings to the second controller.

In another embodiment, the first controller is configured for bidirectional communication with the second controller and negotiation of driver configuration settings to be transferred based on stored contents thereof. The at least driver configuration settings may for example comprise one or more driver-specific, load specific and/or dimming level-specific operating parameters.

In another embodiment, the first controller may be configured during the second operating mode to fully update driver programming as received from the external computing device during the first operating mode.

DETAILED DESCRIPTION

Figure 1:
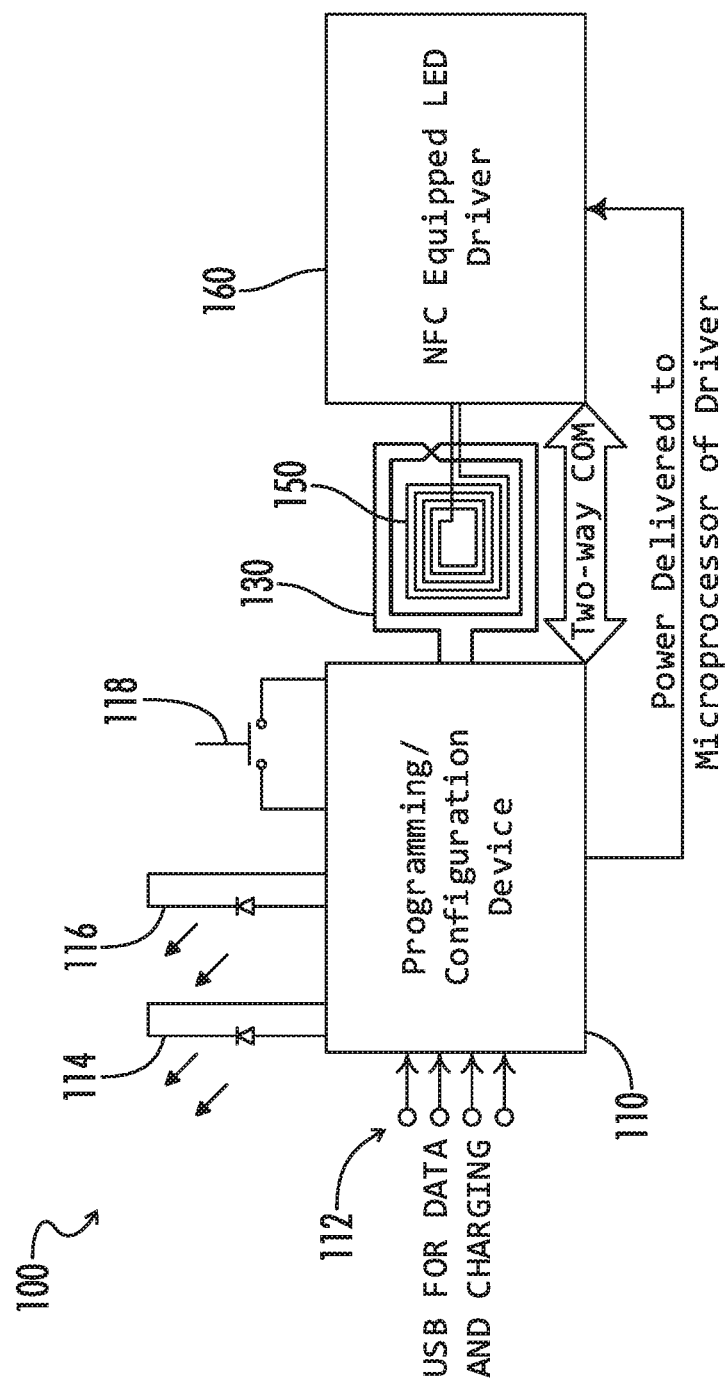
FIG. 1 is a block diagram representing an embodiment of a device as disclosed herein in operable proximity with respect to an NFC-equipped LED driver, in an exemplary operating mode.

Referring generally to FIGS. 1-6, various exemplary embodiments of an invention may now be described in detail. Where the various figures may describe embodiments sharing various common elements and features with other embodiments, similar elements and features are given the same reference numerals and redundant description thereof may be omitted below.

A preferred embodiment of a system 100 including programming and configuration device 110 as disclosed herein is capable of operating in at least a first mode wherein the device is connected to an external device 170 such as a PC or laptop (see FIG. 3), a second mode wherein the device is disconnected from the external device and searches for an operably proximate LED driver, and a third mode of operation wherein the device is operably proximate to an NFC-equipped LED driver 160 (see FIG. 1) and selectively exchanges data therewith.

The term "operably proximate" as used herein may generally refer to an appropriate alignment of the respective antennae, wherein for example the antennae must be in proximity with each other, both antennae must be co-planar, and the extents of the antenna of the NFC equipped driver must be within the extents of the antenna of the programming and configuration device.

Figure 3:
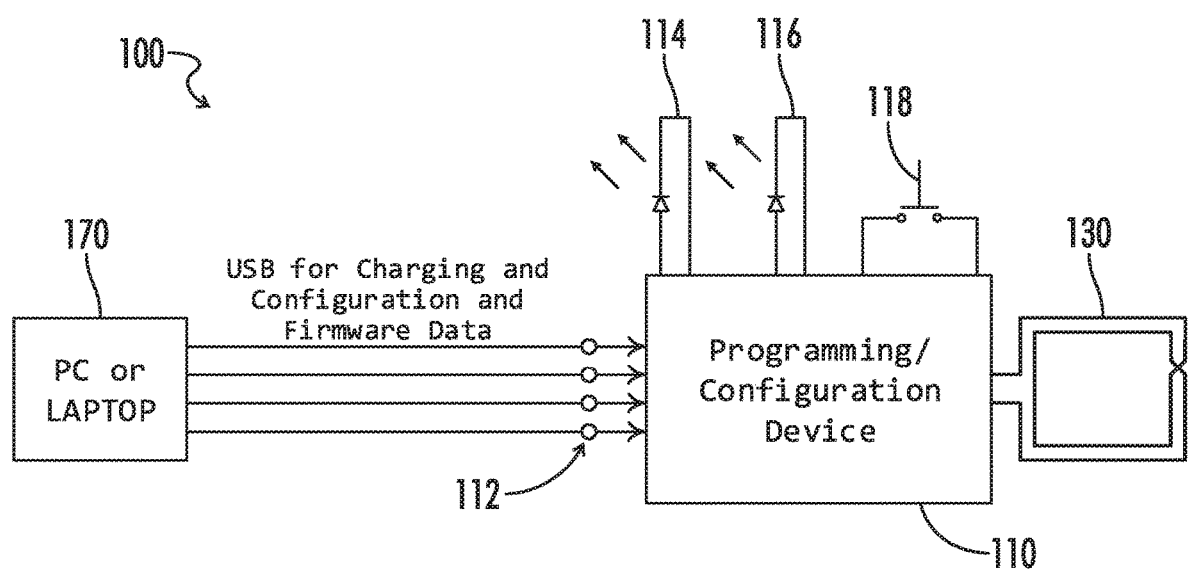
FIG. 3 is a block diagram representing the device of FIG. 1 connected to a PC or laptop for charging and downloading of data, in an exemplary operating mode as disclosed herein.

As shown in FIGS. 1 and 3, the device 110 in an embodiment includes a connector 112 configured as for example a USB interface with a first set of one or more terminals to receive input power and a second set of one or more terminals to send and receive data. The device further includes audio and/or visual indicators 114, 116 such as external LEDs, a user interface 118 such as an actuatable push button or switch, and an antenna or coil 130 for selective bidirectional communications with a corresponding antenna 150 for an LED driver 160 which may be properly aligned therewith. Either or both aforementioned antennae in an embodiment may simply be formed by a plurality of turns on a multi-layer printed circuit board (PCB) that is outside of—or simply not fully encased within—the metal housings of their respective devices.

The LED driver 160 as previously noted is equipped with wireless communications capability such as NFC or an equivalent thereof, and further including a power stage (not shown) configured for powering a light source such as an LED load. The LED driver is typically coupled to an AC mains power input and the power stage is configured to convert the AC input power into a DC output current that is appropriate for the particular light source. The output power provided from the LED driver to the light source may be regulated at least in part by an associated controller and/or one or more switch driver ICs (not shown) which produce control signals to one or more switching elements and regulate an operating frequency thereof. The control signals from the controller/driver ICs may for example be based upon a number of factors, such as preset values, load conditions, and the like, but also based at least in part on dimming control signals which may be provided from an external dimming control device or central lighting control system.

The controller associated with the LED driver may be configured for example to obtain device configuration data via the aforementioned operably linked antennae, and subsequently to generate output current reference signals for regulating the output current from the LED driver, said reference signals corresponding to the device configuration data. The device configuration data may for example describe a desired lighting (dimming) level, and/or various device parameters necessary for proper generation of an output current to the light source corresponding to the desired lighting level. Exemplary such parameters (or values associated with said parameters) may further include minimum and maximum output currents, dimming curve (e.g., linear, logarithmic), dimming control voltages, on/off states for enabling or disabling various programmable features such as lumen maintenance, a threshold voltage for triggering on/off functions, and the like.

Figure 2:
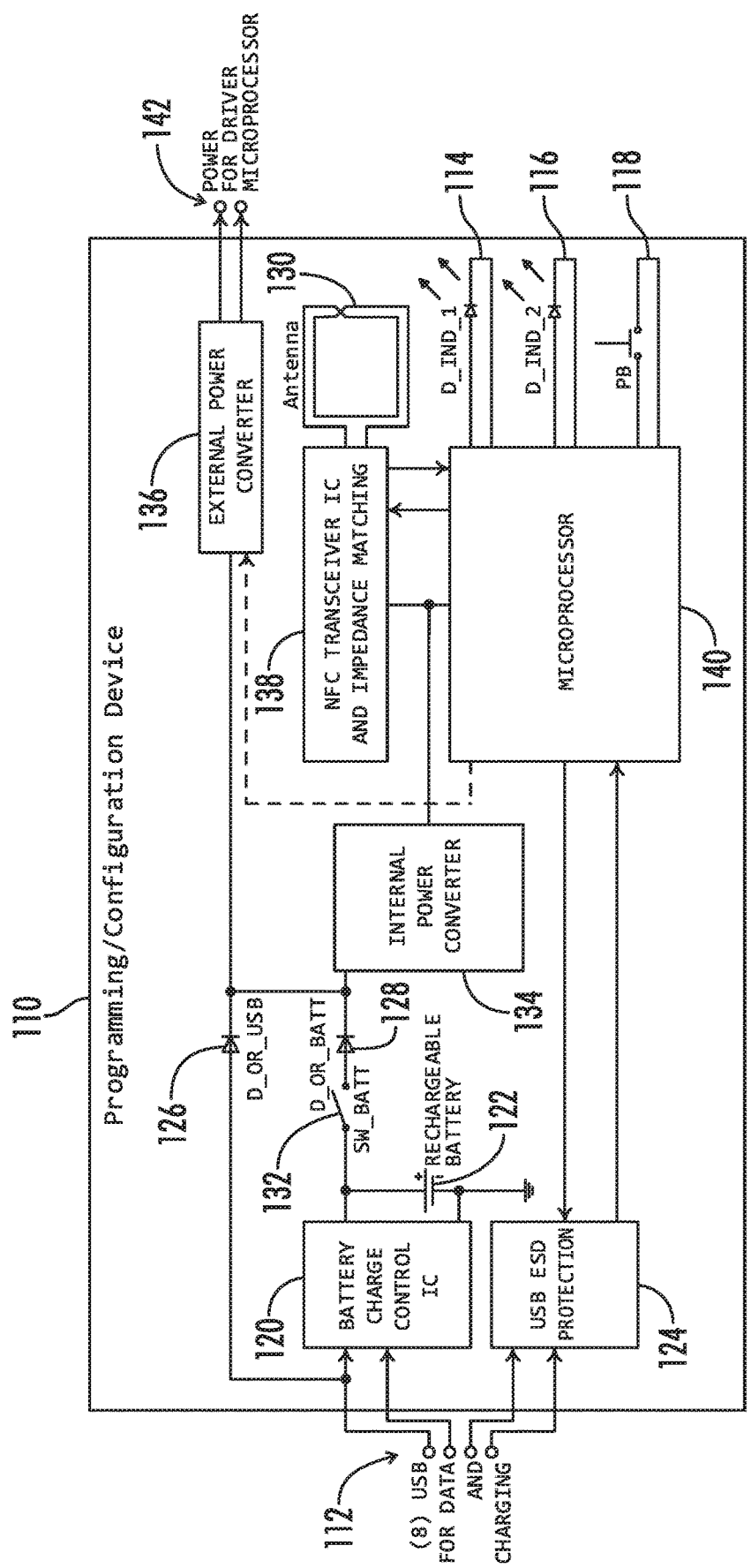
FIG. 2 is a block diagram representing internal components of the device of FIG. 1.
Figure 5:
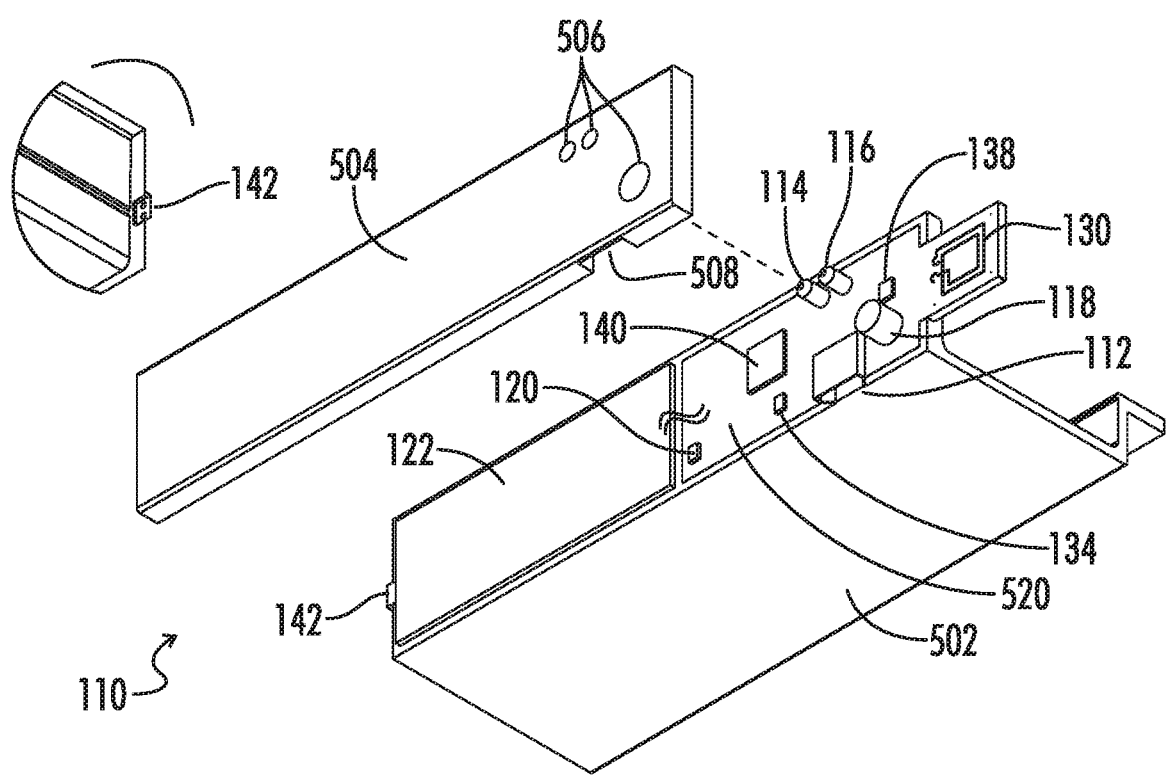
FIG. 5 is an exploded isometric view of an exemplary assembly of a programming and configuration device as disclosed herein.

Referring more particularly to FIGS. 2 and 5, an embodiment of a programming and configuration device 110 includes an energy storage device (e.g., a battery) 122 and a printed circuit board (PCB) 520. The PCB and battery are enclosed in a housing 502 designed to be temporarily attached to an LED driver 160 so as to align the device antenna 130 with the corresponding driver antenna 150. The PCB contains a first connector to connect the PCB to the rechargeable battery, the previously noted USB connector 112 to connect the device to an external PC 170 to recharge the battery and to download new driver configurations or new firmware, and another connector 142 to connect the PCB to the NFC equipped driver 160 to provide power for the driver controller. The housing for the device includes a lid 504 with apertures 506 configured to make the user interface 118 and indicators 114, 116 available to users.

Electronics on the PCB 520 may be provided to download new driver firmware and driver configurations from a PC or laptop 170 to be stored in local non-volatile memory, and to be later provided to an NFC equipped LED driver 160. A controller 140 buffers data received via the USB connector 112 and may internally include the non-volatile memory. The data may be repeated to the LED driver via the respective interconnected device antennae 130, 150 and an NFC transceiver circuit 138 with impedance matching capability.

Figure 6:
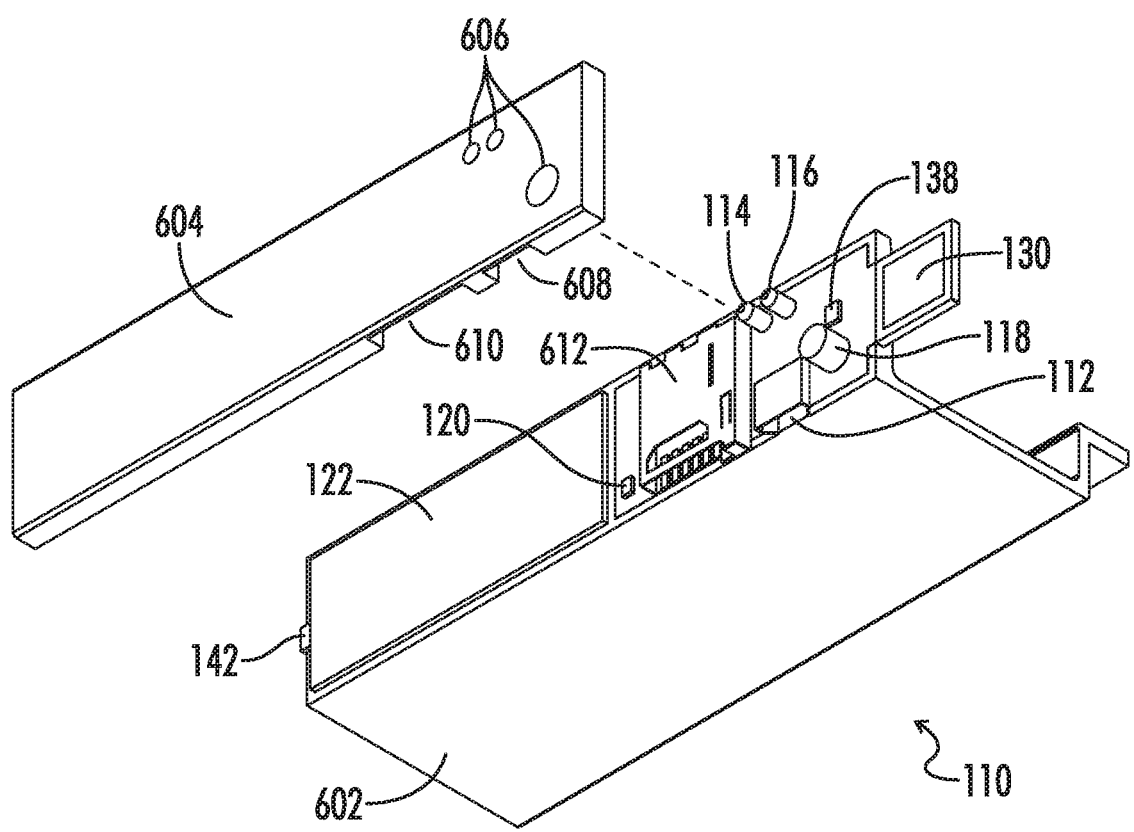
FIG. 6 is an exploded isometric view of another exemplary assembly of a programming and configuration device as disclosed herein, having removeable non-volatile memory.

In an alternative embodiment as shown in FIG. 6, the PCB 520 could contain a slot for removable non-volatile memory 612, such as a MicroSD card.

An electrostatic discharge (ESD) protection circuit 124 is coupled between the data terminals of the input connector 112 and the controller 140 on the programming and configuration device 110. A battery charge control circuit 120 is mounted on the PCB 520 between the power input terminals of the input connector and the battery 122. Also mounted on the PCB 520 of the device 110 is a power converter 136 to convert battery power to a level that can power the microcontroller of the NFC-equipped LED driver 160 if the driver requires an external power source, wherein the output power is deliverable via the provided connector 142.

Status indicators 114, 116 such as LEDs are provided to inform the user that, for example, an NFC equipped driver is coupled to the invention and to indicate completion status to the user. A switch or push button 118 is provided to enable the user to selectively initiate the configuration and/or reprogramming functions, for example when prompted as described below.

To protect the internal circuitry, a housing lid 504 may be adhered, screwed, or snapped into place on the housing 502 of the device. The lid may include a plurality of apertures 506 corresponding to underlying positions of the one or more indicators 114, 116 and the user interface 138, for ease of respective visibility and access. The housing may be constructed with a clip or flange that can wrap around an NFC equipped LED driver 160 and temporarily clip in place with one hand. The clip may be integral to the housing or for example a separate hinged component thereto. This method will ensure the antennae 130, 150 are properly aligned and make it easy to quickly remove when it is time to move to the next LED driver. It should be noted that this is only one of several methods that could be employed to quickly and easily mount the invention to the inside wall of a luminaire or the outside wall of the NFC equipped LED driver, and an invention as disclosed herein is not limited in the means for mounting the device unless otherwise expressly stated. For example, in place of the clip a magnet could be integrated into the housing that would stick to the sheet steel of the luminaire or the sheet steel of the LED driver housing.

Figure 4:
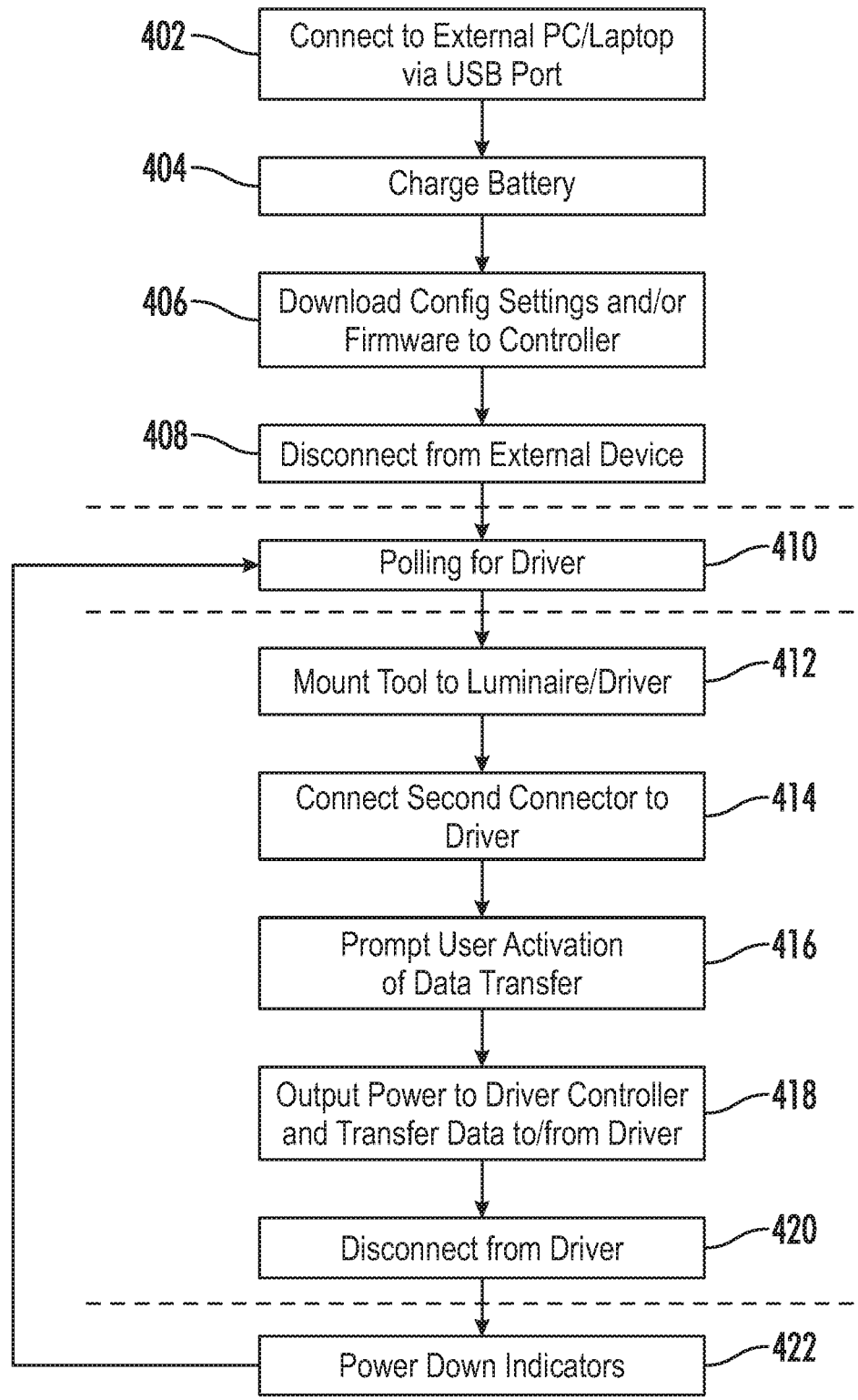
FIG. 4 is a flowchart representing an embodiment of a method for operating a programming and configuration device as disclosed herein.

Referring next to FIG. 4, an exemplary method of operation 400 may now be described with respect to the aforementioned embodiment of the programming and configuration device 110.

The user initially (step 402) connects the programming and configuration device 110 to a host PC or laptop 170 via the provided USB connector 112. When connected to a PC or laptop as shown in FIG. 3, USB power is made available through the battery charge control IC 120 to recharge the battery 122, and also through an internal power converter 134 to power the controller of the programming and configuration device 110 (step 404).

While the battery is charging, the USB connection 112 is further implemented by the PC or laptop 170 to upload any available information regarding any NFC equipped drivers 160 that have been either programmed or configured, after which new configuration settings may be downloaded to the programming and configuration device 110 and stored in local non-volatile memory (step 406). The non-volatile memory may for example be flash memory or electrically erasable programmable read-only memory (EEPROM) and may be part of the integral core memory of the device controller 140 or a separate memory IC connected to the main controller (e.g., microprocessor). The non-volatile memory can also be the removable non-volatile memory 612 previously discussed and as shown in FIG. 6. The USB connection also, when new firmware is available or otherwise as needed, upgrades the firmware of the controller of the programming and configuration device via a USB boot loader.

After charging the battery and downloading new configurations and firmware, the programming and configuration device 110 is disconnected from the PC or laptop 170 (step 408). The device is subsequently turned on by closing a switch ($SW_{BATT}$) coupled to a positive terminal of the rechargeable battery 122, wherein the battery is connected through an ORing diode ($D_{OR\_BATT}$) to the external power converter 136 and the internal power converter 134, which, in turn, powers the device controller 140 and the NFC transceiver IC 138. During this intermediate operating mode, the device controller begins to poll the NFC transceiver IC searching for an NFC equipped driver (step 410).

The user temporarily attaches the programming and configuration device 110 to the side of the NFC equipped LED driver 160, or to an inside wall of a luminaire and sufficiently proximate to and oriented with respect to an antenna of the LED driver (step 412), and runs wires from the output power connector 142 of the device to an input power port of the NFC equipped driver (step 414). When an NFC equipped driver is detected, the controller enables one or more indicators by driving respective diodes $D_{IND\_1}$ and/or $D_{IND\_2}$ to prompt the user to press a momentary switch (step 416). When the momentary switch 118 is pressed to start the programming process and/or the configuration process, the controller 140 detects closing of the internal switch component (PB) and sends a signal to the external power converter 136 to generate power for the controller of the attached LED driver. The controller of the programming and configuration device then communicates with the NFC transceiver IC 138 to transfer data from local non-volatile memory to the NFC equipped driver, thereby updating the configuration settings and, if necessary, updating the LED driver's firmware (step 418).

Upon completion of the configuration and, if necessary, firmware update the controller 140 of the programming and configuration device 110 disables the output power to no longer power the controller of the NFC equipped LED driver 160 and indicates to the user that the updates are completed by actuating one or more of the external LEDs 114, 116 (step 420).

The user easily removes the programming and configuration device 110 from its position mounted to the LED driver (or to the luminaire in operable proximity with the LED driver) and all indication ceases (step 422), thereby conserving battery power and preparing the user for the next NFC equipped driver detection (returning to step 410).

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct physical or electrical connection between the connected items or an indirect connection through one or more passive or active intermediary devices.

The term "circuit" means at least either a single component or a multiplicity of components, either active and/or passive, that are coupled together to provide a desired function.

Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An apparatus for configuring and/or programming one or more programmable lighting drivers, the apparatus comprising:
   a first connector having one or more terminals;
   a second connector having one or more terminals;
   an antenna;
   an energy storage device coupled to the first connector and configured, during a first operating mode wherein the first connector is coupled to an external computing device, to receive and store power therein;
   a first controller coupled to the first connector and configured during the first operating mode to receive and store at least driver configuration settings;
   the energy storage device is configured during a second operating mode, wherein the second connector is coupled to a corresponding connector for a programmable lighting driver, to provide power via the second connector to a second controller associated with the programmable lighting driver;
   the first controller is configured during the second operating mode to transfer the stored at least driver configuration settings to the second controller via a wireless communications network comprising the antenna and a corresponding antenna for the programmable lighting driver; and
   wherein the first controller is coupled to the antenna via a near field communication transceiver, and the first controller is configured during a third operating mode, wherein the first connector is disconnected from the external computing device and the second connector is disconnected from any driver, to poll the near field communication transceiver for a driver antenna in operable proximity thereto.

2. The apparatus of claim 1, further comprising a first power converter configured to deliver a first power to the first controller when the first connector is disconnected from the external computing device, and a second power converter configured to deliver a second power to the programmable lighting driver during the second operating mode.

3. The apparatus of claim 2, further comprising a housing configured to mount with respect to a luminaire having the driver installed thereto, wherein the antenna for the apparatus is positioned in operable proximity to the corresponding antenna for the programmable lighting driver.

4. The apparatus of claim 3, wherein at least a portion of the housing is mounted to at least a corresponding portion of a housing associated with the programmable lighting driver.

5. The apparatus of claim 3, wherein the housing is detachably coupled to a side of the luminaire.

6. The apparatus of claim 1, further comprising a non-volatile memory unit functionally linked to the first controller to retrievably store the at least driver configuration settings.

7. The apparatus of claim 1, wherein the first controller comprises a non-volatile memory unit to retrievably store the at least driver configuration settings received thereby.

8. The apparatus of claim 1, comprising one or more indicators coupled to the first controller, at least one of the one or more indicators configured to indicate a detected operable proximity between the antenna and a driver antenna, and
   an actuator configured upon user actuation to initiate the second operating mode wherein power is provided to the second controller.

9. The apparatus of claim 8, wherein at least one of the one or more indicators is configured to indicate a completed transfer of the at least driver configuration settings to the second controller.

10. The apparatus of claim 1, wherein the first controller is configured for bidirectional communication with the second controller and negotiation of driver configuration settings to be transferred based on stored contents thereof.

11. The apparatus of claim 10, wherein the at least driver configuration settings comprise one or more driver-specific, load specific and/or dimming level-specific operating parameters.

12. The apparatus of claim 10, wherein the first controller is configured during the second operating mode to fully update driver programming as received from the external computing device during the first operating mode.

13. A method for implementing a portable programming device to configure and/or update programming for one or more programmable lighting drivers, the method comprising:
   upon connection of an external computing device to a first connector associated with the portable programming device:
      receiving and storing power from the external computing device, and
      receiving and storing at least driver configuration settings from the external computing device;
   upon disconnection of the external computing device from the first connector associated with the portable programming device, and connection of a second connector associated with the portable programming device to a corresponding connector for a programmable lighting driver:
      providing power via the second connector to a controller associated with the driver; and
      transferring the stored at least driver configuration settings to the controller via a wireless communications network comprising an antenna associated with the portable programming device and positioned in operable proximity with respect to a corresponding antenna for the driver; and
   upon the first connector being disconnected from the external computing device and the second connector being disconnected from any driver, sensing a driver antenna in operable proximity to the antenna associated with the portable programming device.

14. The method of claim 13, further comprising delivering a first power output to a controller associated with the portable device when the first connector is disconnected from the external computing device, and delivering a second power output to the programmable lighting driver when connected thereto.

15. The method of claim 14, upon disconnection of the external computing device from the first connector associated with the portable device, further comprising mounting a housing associated with the portable programming device with respect to a luminaire having the programmable lighting driver installed thereto, wherein an antenna for the apparatus is positioned in operable proximity to the corresponding antenna for the programmable lighting driver.

16. The method of claim 15, wherein at least a portion of the housing is mounted to at least a corresponding portion of a housing associated with the programmable lighting driver.

17. The method of claim 15, wherein the housing associated with the portable programming device is detachably coupled to a side of the luminaire.

18. The method of claim 13, wherein transferring the stored at least driver configuration settings to the controller comprises one or more of:

> negotiation of driver configuration settings to be transferred via bidirectional communication with the driver controller and based on stored contents thereof, wherein the at least driver configuration settings comprise one or more driver-specific, load specific and/or dimming level-specific operating parameters; and
>
> fully updating driver programming.

* * * * *